United States Patent Office 3,812,198
Patented May 21, 1974

3,812,198
COMPLEXATION OF 2,6-DIMETHYLNAPHTHAL-ENE WITH p-NITROBENZOIC ACID
John A. Hedge, Wilmington, Del., assignor to Sun Research and Development Co., Marcus Hook, Pa.
No Drawing. Filed Dec. 20, 1972, Ser. No. 317,013
Int. Cl. C07c 7/02
U.S. Cl. 260—674 N                              17 Claims

ABSTRACT OF THE DISCLOSURE 2,6-dimethylnaphthalene can be separated from other like hydrocarbons by complexing with p-nitrobenzoic acid.

BACKGROUND OF THE INVENTION

The invention relates generally to a process for fractionating a dimethylnaphthalene from a liquid mixture of cyclic hydrocarbons. More specifically, it relates to a process for fractionating 2,6-dimethylnaphthalene from a mixture of cyclic hydrocarbons having close physical properties, for example, boiling points. Generally the mixture is contacted with p-nitrobenzoic acid, and subsequently the resulting complexate is separated and decomposed. The decomposition can be in more than one step thereby obtaining, for example, two fractions, one containing only 2,6-dimethylnaphthalene and the other highly enriched in 2,6-dimethylnaphthalene.

2,6-dimethylnaphthalene is oxidized to its corresponding acid which is used in the production of dyes and pigments. The acid and/or its ester can also be used to form a polymer having utility as fiber or film. A more detailed discussion of the utility of dimethylnaphthalenes appears in "Naphthalenecarboxylic Acids" by K. A. Scott in Kirk-Othmer, Encyclopedia of Chemical Technology, 2nd Edition, vol. 13.

For convenience, dimethylnaphthalene or dimethylnaphthalenes herein will be referred to as DMN with specific DMN isomers being indicated by reference to the location of the methyl groups. For example, 2,6-dimethylnaphthalene will be referred to as 2,6-DMN. Also, for convenience, p-nitrobenzoic acid will be referred to as PNA.

DMN are found in coal tar, lignite tar, crude oil, the drip oil fraction produced during the pyrolysis of hydrocarbons to make olefins, in heavy petroleum reformate and in petroleum gas oil produced by catalytic cracking. In these hydrocarbon mixtures, DMN are usually present in dilute concentration. For example, one analysis shows DMN making up about 16 percent by weight of a gas oil. However, by known processes such as distillation, crystallization and solvent extraction, DMN can be recovered in concentrated form from the previously mentioned sources. In oxidizing these DMN to carboxylic acids, it is usually preferable that each isomer be oxidized by itself since generally each isomer requires slightly different reaction conditions for optimum oxidation.

Most, if not all, the isomers of DMN usually are present in these hydrocarbon mixtures. These DMN isomers, as well as certain other $C_{12}$ alkylnaphthalenes such as ethylnaphthalenes, have boiling points which are extremely close to each other. This closeness in boiling points makes it extremely difficult to distill apart the individual isomers or distill some isomers from other cyclic hydrocarbons such as Tetralins and indans. And in particular, 2,6-DMN and 2,7-DMN have the same boiling points, thus these latter isomers cannot be separated by distillation.

Certain DMN isomers can be separated using the differences in their freezing points. These methods are disclosed in U.S. Pat. No. 3,202,726, issued Aug. 24, 1965 to E. W. Malmberg et al. and U.S. Pat. No. 3,173,960, issued Mar. 16, 1965 to W. M. Robinson. However, despite differences in freezing points, various DMN isomers form eutectics, thus making it impossible to further separate these isomers by crystallization. For example, 2,6-DMN with a freezing point of 234° F. and 2,3-DMN with a freezing point of 221° F. form a eutectic with a freezing point of about 170° F. Thus other methods besides crystallization and distillation are needed for separating 2,6-DMN from its isomers and other closely boiling cyclic hydrocarbons.

Other techniques have been suggested for purification and/or separation of DMN. U.S. Pat. No. 3,183,279, issued May 11, 1965 to I. W. Mills et al. uses selective oxidations; U.S. Pat. No. 3,155,739, issued Nov. 3, 1964 to G. Suld uses a $HF-BF_3$ complex. Still others have facilitated separation and/or purification by isomerizing various DMN isomers to specific isomers (see J. Org. Chem., 29, 2939–2946, 1964, G. Suld et al.).

Complexation of various DMN with di- or trianhydrides of certain carboxylic acids is disclosed in U.S. Pat. No. 3,665,043, issued May 23, 1972 to R. I. Davis et al. Use of 2-chloro-4-nitrobenzoic acid as a complexing agent is disclosed in U.S. Pat. No. 3,665,044, issued May 23, 1972 to K. A. Scott. Also, U.S. Pat. No. 3,665,045, issued May 23, 1972 to R. I. Davis et al. discloses the use of certain dianhydrides of carboxylic acids to fractionate a eutectic mixture of 2,6-DMN-2,7-DMN. Finally, the use of tetrahalophthalic anhydride as a complexing agent to fractionate DMN is disclosed in U.S. Pat. No. 3,670,039, issued June 13, 1972 to R. I. Davis. More specifically, Netherlands application 7104231, opened Oct. 4, 1971, discloses that:

(1) isomeric dimethylnaphthalenes are separated by complexing with m-nitrobenzoic acid so that a 2,6-dimethyl complex is present in major amount and separates as a solid; but,
(2) o-cyanobenzoic acid, m-cyanobenzoic acid, p-cyanobenzoic acid, o-nitrobenzoic acid, p-nitrobenzoic acid, and the methyl esters of the five aforementioned acids do not form stable complexes with DMN isomers which can be isolated as such.

Thus, it is surprising, in view of the prior art, that applicant has found that 2,6-DMN can be separated from other like hydrocarbons, such as 2,7-DMN, by complexing with p-nitrobenzoic acid. Also, in summary, the separation of DMN isomers from each other by known methods is difficult. There is a need for another purification and/or separation method or a method which facilitates existing procedures.

SUMMARY OF THE INVENTION

A cyclic hydrocarbon mixture having a narrow boiling point range and containing a majority of dimethylnaphthalene, is contacted with PNA. As to the dimethylnaphthalene at least 10 weight percent of the mixture is 2,6-DMN. The resulting solid DMN-PNA complexate is separated from the mixture. The solid complexate is decomposed and the subsequently released cyclic hydrocarbon has a composition substantially different from the original hydrocarbon mixture. In particular, the subsequently released mixture is enriched in 2,6-DMN. The decomposition can be stepwise so that one released fraction contains only 2,6-DMN.

DESCRIPTION

The complexing agent used in this invention is p-nitrobenzoic acid (PNA). It has a melting point of 239–241° C. (462–465° F.). This acid is added as a solid to the liquid cyclic hydrocarbon mixture having a boiling point of about 485°–520° F. and containing a majority of DMA of which at least about 10 weight percent is 2,6-dimethylnaphthalene. The liquid mixture, during the addition, can be at either ambient or an elevated temperature. However, if the elevated temperature exceeds about 300° F., discoloration of the mixture occurs. Therefore, while the addition temperature could almost be 300° F., it is desirable that a lower elevated temperature be used, preferably below 275° F. and more preferably below 250° F.

The resulting admixture of DMA and PNA is maintained a suitable temperature, with or without agitation, until the desired complexation occurred. A gradual change in color of the PNA from white to yellow indicates the forming of the desired complexate.

Generally, some DMN isomers complex more readily than others with PNA. In particular, and surprisingly, 2,6-DMN complexes much more readily with PNA than 2,7-DMN. This preference of 2,6-DMN to form a 2,6-DMN-PNA complex can be used to separate 2,6-DMN from a hydrocarbon mixture containing many closely related compounds and having a boiling point of about 485°–520° F. and containing a majority of dimethylnaphthalene including some 2,6-DMN.

The cyclic feed to this process can include other compounds that do not alter or destroy the structure of the complex. In general, appreciable quantities of undesirable compounds that will react with the acid are to be avoided. Compounds such as $C_4$ to $C_{20}$ alkanes, alkenes, cycloalkanes, cycloalkenes or mixtures thereof are relatively inert and have no appreciable effect on the complex formation. Moreover, hydrocarbons boiling outside about 485–520° F. and which form complexes with PNA should not be present in appreciable quantities in the feed. Preferably, cyclic hydrocarbons having a boiling point of about 485–520° F. are $C_{11-13}$ bicyclic aromatic hydrocarbons, more preferably, $C_{12}$ alkylnaphthalenes and ideally they are only DMN. Narrower boiling points for example, of 490–515° F. minimize undesirable hydrocarbons and an even narrower boiling range, for example, of 495–510° F. even further minimizes undesirable hydrocarbons.

The amount of PNA employed in the complexing step can vary over a wide range depending upon the fractionation desired. The amount of PNA is related to the amount of DMN present. Preferably, the amount of PNA dissolved in the hydrocarbon mixture is in the range from 0.01 to 5.0 moles of PNA per mole of DMN. A preferred narrower range is from 0.10 to 3.0 moles of PNA per mole of DMN. The contacting of the cyclic hydrocarbons with PNA can be performed in one contacting stage or a plurality of distinct contacting stages.

The solid complexate is readily separated from the resulting admixture. Filtration, decantation or centrifugation can be used to remove the complex. Separation of the complexate from the admixture is ordinarily performed at a temperature below about 150° F.; temperatures between 50° and 125° F. are particularly effective for PNA–DMN complex separation. Lower separation temperatures, e.g., 0° F., can also be used.

After separation, it is advisable to wash the solid complexate with a light hydocarbon solvent in order to remove the physically absorbed liquid mixture from the complex, after which the complex can be vacuum dried. Pentane is an excellent wash solvent.

Several techniques can be employed to decompose the solid complexate. A procedure for decomposing the solid complexate involves heating in the presence of an inert solvent, such as $C_4$ to $C_{20}$ alkanes, alkenes, cycloalkanes, cycloalkenes or mixtures thereof such as aliphatics, whereby the complexate decomposes and two layers are formed one consisting of the complexing acid and the other of a solution of the DMN in a solvent. Accordingly, if a low boiling alkanes, for example, hexane is used as a solvent, it may be necessary to use superatmospheric pressure in order to maintain the necessary decomposition temperature. The recovered DMN can be separated from the solution by evaporating the solvent.

Another procedure for decomposing the complex is to contact it with water or an auqeous base, such as aqueous sodium hydroxide. With the aqueous base, the acid becomes a salt in the resulting water layer and the organic layer is DMN. The salt in the water layer facilitates the separation of the two layers.

Decomposition of the solid complexate can also be done in a plurality of distinct stages. For example, after the solid complexate is washed to remove physically absorbed liquid, it can be refluxed in inert solvent, e.g., isooctane. The solvent is separated hot from the solid complexate and cooled to ambient temperature. During the cooling of the inert solvent crystals of 2,6-DMN precipitate. Surprisingly, the crystals analyze 100% 2,6-DMN. In addition, the cooled inert solvent contains cyclic hydrocarbons having a proportion of 2,6-DMN greater than that contained in the starting feed. These DMN can be separated from the nonreactive solvent by known methods such as distillation.

The partially decomposed solid complexate separated from the hot inert solvent can be completely decomposed thereby releasing the remaining cyclic hydrocarbons. The latter also contains a proportion of 2,6-DMN greater than that contained in the starting feed. The complete decomposition of the remaining solid complexate can be obtained as described heretofore.

The following comparative runs and examples illustrate the invention:

TABLE.—FORMATION OF DMN-PNA COMPLEXES

| | Mole percent | | | | |
|---|---|---|---|---|---|
| | | | | Mixture from— | |
| Compounds | Feed | Noncomplexate | Crystallized fraction | Partially decomposed complexate | Completely decomposed complexate |
| Others* | 10.8 | 10.0 | | 5.8 | |
| Ethylnaphthalenes | 6.5 | 6.4 | | 2.2 | |
| 2,6-DMN | 14.6 | 11.7 | 100 | 54.5 | 82.3 |
| 2,7-DMN | 19.6 | 18.9 | | 9.3 | 4.6 |
| 1,6-DMN | 13.4 | 15.2 | | 7.7 | 3.7 |
| 2,3-DMN | 1.5 | 1.0 | | 1.5 | |
| Other DMN's | 33.6 | 36.8 | | 19.0 | 9.4 |

*Tetralins, indans, and alkylbenzenes.

EXAMPLE I

A water white cyclic hydrocarbon mixture boiling between 495–510° F. and having the composition shown in the attached table, see Feed, was treated with PNA in the following manner. 0.64 moles of PNA per mole of 2,6-DMN (equal to 0.094 moles of PNA per mole of DMN) was added to the hydrocarbon mixture (also referred to as DMN concentrate). The PNA used was white crystals having a melting point of about 240° C. The resulting mixture was allowed to stand at room temperautre. After five days, the solid, consisting of unreacted PNA and yellow crystals of complexate was filtered out of the liquid mixture. The remaining liquid was analyzed. Its composition is shown in the Table, see column titled Noncomplexate.

The solid complexate was washed with nonheated isooctaine. Next, the complexate was refluxed in isooctane (boiling point 118° C.) for about 15 minutes. The solid complexate was filtered hot from the isooctane. The hot isooctane was allowed to cool. During the cooling of the isooctane, 2,6-DMN crystallized out, see Table column titled Crystallized Fraction. Surprisingly, these crystals analyze 100% 2,6-DMN via nuclear magnetic resonance.

Remaining in solution in the cooled isooctane was a cyclic hydrocarbon fraction. The composition of this fraction is shown in the Table, see column titled Mixture from Partially Decomposed Complexate.

The partially decomposed solid complexate filtered hot from the isooctane was refluxed in benzene; boiling point 80° C. (165° F.). The composition of the cyclic fraction released from the decomposed solid complexate is shown in the Table, see column titled Mixture for Completely Decomposed Complexate. Surprisingly, this fraction was substantially enriched in 2,6-DMN.

EXAMPLE II 1.6 moles of PNA were added to 1 mole of 2,6-DMN contained in DMN concentrated having the same composition as the concentrate used in Example I. The mixture was warmed on a steam bath for five minutes. Afterward the mixture was allowed to sit undisturbed at room temperature. At the end of six days, the liquid contained 10.2% 2,6-DMN; after eight days, it contained 9.6% 2,6-DMN. Since the feed contained 14.6% 2,6-DMN, these results indicated the continuing complexation of 2,6-DMN.

Other feeds having different boiling points, e.g., 490–515° F., and/or different compositions will respond in a like manner. Also, use of other mole ratio, e.g., 2.0 moles of PNA per mole of DMN, will yield similar results.

TEMPERATURE LIMITATION

Another run showed the sensitivity of the complexation to higher temperature. A mixture of DMN concentrate (composition the same as in Example I) and PNA was heated to a temperature above 150° C. (302° F.). The mixture turned black. This discoloration indicated another reaction (other than complexation) taking place, and therefore considered undesirable.

COMPARATIVE

A series of runs were performed using the following nitrobenzoic derivatives:

2,4-dinitrobenzoic acid
3,5-dinitrobenzoic acid
4-methyl-3-nitrobenzoic acid
3-methyl-4-nitrobenzoic acid
2-methyl-5-nitrobenzoic acid
4-nitrophthalic acid
3-nitrophthalic-1,8-anhydride The procedure was as that described in Example I. However, these derivatives were found to be non-selective as to any of the DNM's or other compounds present in the feed. That is to say, the composition of the liquid DMN concentrate remained unchanged after five days.

The invention claimed is:

1. A method of preferentially fractionating 2,6-dimethylnaphthalene from a liquid cyclic hydrocarbon mixture having a boiling point of about 485–520° F. and containing a majority of dimethylnaphthalene of which at least about 10 weight percent is 2,6-dimethylnaphthalene comprising:
   (a) contacting said liquid mixture with solid p-nitrobenzoic acid at a temperature below the discoloration temperature of the p-nitrobenzoic acid to complex preferentially with the dimethylnaphthalenes and form a complex containing less than the total amount of dimethylnaphthalene in said mixture;
   (b) separating the solid complex from the resulting mixture; and,
   (c) decomposing the solid complex to recover the resulting complexate having a greater proportion of 2,6-dimethylnaphthalene than the starting hydrocarbon mixture.

2. Method according to claim 1 wherein the mole ratio of p-nitrobenzoic acid to dimethylnaphthalenes is 0.01 to 5.0.

3. Method according to claim 1 wherein before step (b) the resulting admixture of liquid and acid is maintained at an elevated temperature which is below the discoloration temperature of the acid and then the resulting mixture is cooled.

4. Method according to claim 3 wherein after step (b) the separated solid complex is partially decomposed by contacting with an aliphatic hydrocarbon liquid at an elevated temperature which is below the boiling point of said liquid, and then the remaining solid is separated from the heated resulting mixture and said liquid containing dissolved 2,6-dimethylnaphthalene is cooled thereby crystallizing the dissolved 2,6-dimethylnaphthalene.

5. Method according to claim 4 wherein the crystallized 2,6-dimethylnaphthalene is separated from the cooled aliphatic hydrocarbon liquid.

6. Method according to claim 5 wherein the aliphatic hydrocarbon liquid is paraffinic.

7. Method according to claim 5 wherein the cyclic hydrocarbons remaining in the cooled liquid are separated from the said liquid.

8. Method according to claim 7 wherein the separation of said cyclic hydrocarbon from the cooled aliphatic hydrocarbon liquid is by distillation.

9. Method according to claim 5 wherein the remaining solid complex, separated from resulting mixture at an elevated temperature which is below the boiling point of the aliphatic hydrocarbon liquid, its further decomposed to recover the resulting complexate having a greater proportion of 2,6-dimethylnaphthalene than the starting hydrocarbon mixture.

10. Method according to claim 7 wherein the remaining solid complex, separated from the resulting mixture at an elevated temperature which is below the boiling point of the aliphatic hydrocarbon liquid, is further decomposed to recover the resulting complexate having a greater proportion of 2,6-dimethylnaphthalene than the starting hydrocarbon mixture.

11. Method according to claim 1 wherein the hydrocarbon mixture has a boiling point of 490–515° F.

12. Method according to claim 1 wherein the hydrocarbon mixture consists essentially of $C_{11-13}$ bicyclic aromatics.

13. Method according to claim 2 comprising:
   (a) contacting the liquid mixture with solid p-nitrobenzoic acid at a temperature below about 150° C. to complex preferentially with the dimethylnaphthalenes and form a complex containing less than the total amount of dimethylnaphthalene in said mixture;
   (b) separating the solid complex from the resulting mixture which at separation is at a temperature below about 100° C.;
   (c) partially decomposing the solid complex by contacting with a paraffinic hydrocarbon liquid at an elevated temperature which is below the boiling point of said liquid;
   (d) separating said parafinic liquid from the remaining solid complex and then cooling said liquid thereby causing crystallization of the dissolved 2,6-dimethylnaphthalene and separating the remaining cyclic materials from said liquid; and
   (e) decomposing the remaining solid complex to recover the resulting complexate having a greater proportion of 2,6-dimethylnaphthalene than the starting hydrocarbon mixture.

14. Method according to claim 13 wherein the liquid mixture is a mixture of $C_{11-13}$ bicyclic aromatic hydrocarbons.

15. Method according to claim 13 wherein the liquid mixture is a mixture of $C_{12}$ alkylnaphthalenes.

16. Method according to claim 13 wherein the liquid mixture is a mixture of dimethylnaphthalenes.

17. Method according to claim 13 wherein the mole ratio of p-nitrobenzoic acid to dimethylnaphthalene is 0.01 to 3.0.

References Cited

UNITED STATES PATENTS

| | | | |
|---|---|---|---|
| 3,665,044 | 5/1972 | Scott | 260—674 |
| 3,725,490 | 4/1973 | Nagahama et al. | 260—674 |

DELBERT E. GANTZ, Primary Examiner

C. E. SPRESSER, Jr., Assistant Examiner